United States Patent
Jo (10) Patent No.: US 10,640,074 B2
(45) Date of Patent: May 5, 2020

(54) SIDE AIRBAG APPARATUS

(71) Applicant: HYUNDAI MOBIS CO., LTD., Seoul (KR)

(72) Inventor: Kum Ho Jo, Yongin-Si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 38 days.

(21) Appl. No.: 16/008,033

(22) Filed: Jun. 14, 2018

(65) Prior Publication Data

US 2019/0001916 A1 Jan. 3, 2019

(30) Foreign Application Priority Data

Jun. 30, 2017 (KR) .................. 10-2017-0083141

(51) Int. Cl.
*B60R 21/207* (2006.01)
*B60R 21/231* (2011.01)
*B60R 21/237* (2006.01)
*B60R 21/01* (2006.01)

(52) U.S. Cl.
CPC ...... *B60R 21/23138* (2013.01); *B60R 21/207* (2013.01); *B60R 21/01* (2013.01); *B60R 21/237* (2013.01); *B60R 2021/23146* (2013.01)

(58) Field of Classification Search
CPC ................. B60R 21/207; B60R 21/23138
See application file for complete search history.

(56) References Cited

U.S. PATENT DOCUMENTS

| 5,584,508 | A | * | 12/1996 | Maruyama | B60R 21/231 280/732 |
|---|---|---|---|---|---|
| 5,806,881 | A | * | 9/1998 | Richter | B60R 21/231 280/730.2 |
| 7,207,594 | B2 | * | 4/2007 | Igawa | B60R 21/206 280/730.1 |
| 7,594,678 | B2 | * | 9/2009 | Schedler | B60R 21/23138 280/729 |
| 8,186,708 | B2 | * | 5/2012 | Zhou | B60R 21/16 280/730.2 |
| 8,727,375 | B2 | * | 5/2014 | Suzuki | B60R 21/233 280/730.2 |
| 9,120,455 | B2 | * | 9/2015 | Sugimoto | B60R 21/231 |
| 2014/0159355 | A1 | * | 6/2014 | Fujiwara | B60R 21/23138 280/730.2 |
| 2015/0217714 | A1 | * | 8/2015 | Fujiwara | B60R 21/23138 280/729 |

FOREIGN PATENT DOCUMENTS

JP 6110723 B2 * 4/2017 ........... B60R 21/207

\* cited by examiner

*Primary Examiner* — James A English
(74) *Attorney, Agent, or Firm* — H.C. Park & Associates, PLC (57) ABSTRACT

A side airbag apparatus including: an outboard sheet disposed at a side of a vehicle; an inboard sheet stacked on an inner surface of the outboard sheet, and forming a buffer chamber with the outboard sheet; a push chamber formed by folding a part of the inboard sheet, expanded to protrude to the interior with injection of gas, and pushing up an arm of a passenger; and a sewed part through which circumferences of the outboard sheet and the inboard sheet are sewed, with the push chamber folded.

7 Claims, 11 Drawing Sheets

SIDE AIRBAG APPARATUS

CROSS-REFERENCES TO RELATED APPLICATIONS

The present application claims from and the benefit of Korean Patent Application No. 10-2017-0083141, filed on Jun. 30, 2017, which is hereby incorporated by reference for all purposes as is set forth herein.

BACKGROUND

Field

Exemplary embodiments of the invention relate to a side airbag apparatus, and more particularly, to a side airbag apparatus capable of preventing the chest of a passenger from being injured by expansion pressure of a buffer chamber in case of an oblique collision of a vehicle.

DISCUSSION OF THE BACKGROUND

In general, a vehicle has an airbag installed to protect a passenger. The airbag is disposed at various positions depending on the passenger's parts which need to be protected. For example, a side airbag is disposed outside a seat.

In case of an oblique collision of the vehicle, gas is injected into the side airbag. The side airbag is expanded by the gas, and buffers and protects the outside of the passenger.

Depending on the collision test regulation in each country, a dummy model serving as a test target can be changed. When the dummy model is changed in such a manner that each arm of the dummy model is further lowered, the arm of the dummy model is positioned almost in parallel to the body of the dummy model. As the arm is positioned in parallel to the body, a space between the side of the vehicle and the arm is narrowed. In this case, when the side airbag is expanded, the arm is stuck between the side airbag and the body. Thus, the expansion pressure of the side airbag causes the arm to press the chest of the dummy model. Therefore, the expansion pressure of the side airbag may injure the chest of the passenger.

The above information disclosed in this Background section is only for enhancement of understanding of the background of the invention and, therefore, it may contain information that does not constitute prior art.

SUMMARY

Exemplary embodiments of the present invention are directed to a side airbag apparatus capable of preventing the chest of a passenger from being injured by expansion pressure of a buffer chamber in case of an oblique collision of a vehicle.

An exemplary embodiment of the invention provides a side airbag apparatus including: an outboard sheet disposed at a side of a vehicle; an inboard sheet stacked on an inner surface of the outboard sheet, and forming a buffer chamber with the outboard sheet; a push chamber formed by folding a part of the inboard sheet, expanded to protrude to the interior with injection of gas, and pushing up an arm of a passenger; and a sewed part through which circumferences of the outboard sheet and the inboard sheet are sewed, with the push chamber folded.

A length of the inboard sheet may be greater than that of the outboard sheet, and the push chamber may be formed by folding a spare region of the inboard sheet, after the circumferences of the inboard sheet and the outboard sheet are put together.

The push chamber may be formed by folding the spare region in two layers from the widthwise central portion of the spare region to both sides in the widthwise direction.

The push chamber may be formed by folding the spare region in a zigzag manner in the widthwise direction of the push chamber.

The push chamber may be positioned eccentrically at one side based on the longitudinal central portion of the inboard sheet.

The push chamber may be inclined downward toward the front so as to push up the arm of the passenger from the rear.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings First, a side airbag apparatus in accordance with a first embodiment of the present invention will be described.

Figure 1:
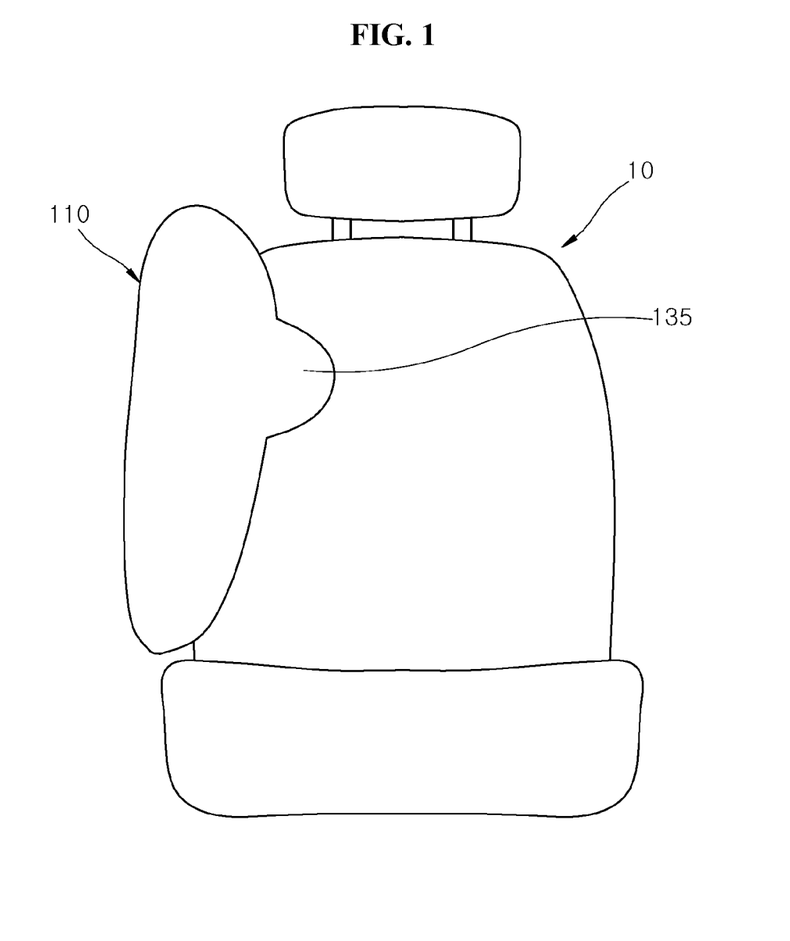
FIG. 1 is a front view schematically illustrating that a side airbag apparatus in accordance with a first embodiment of the present invention is expanded at one side of a seat.
Figure 2:
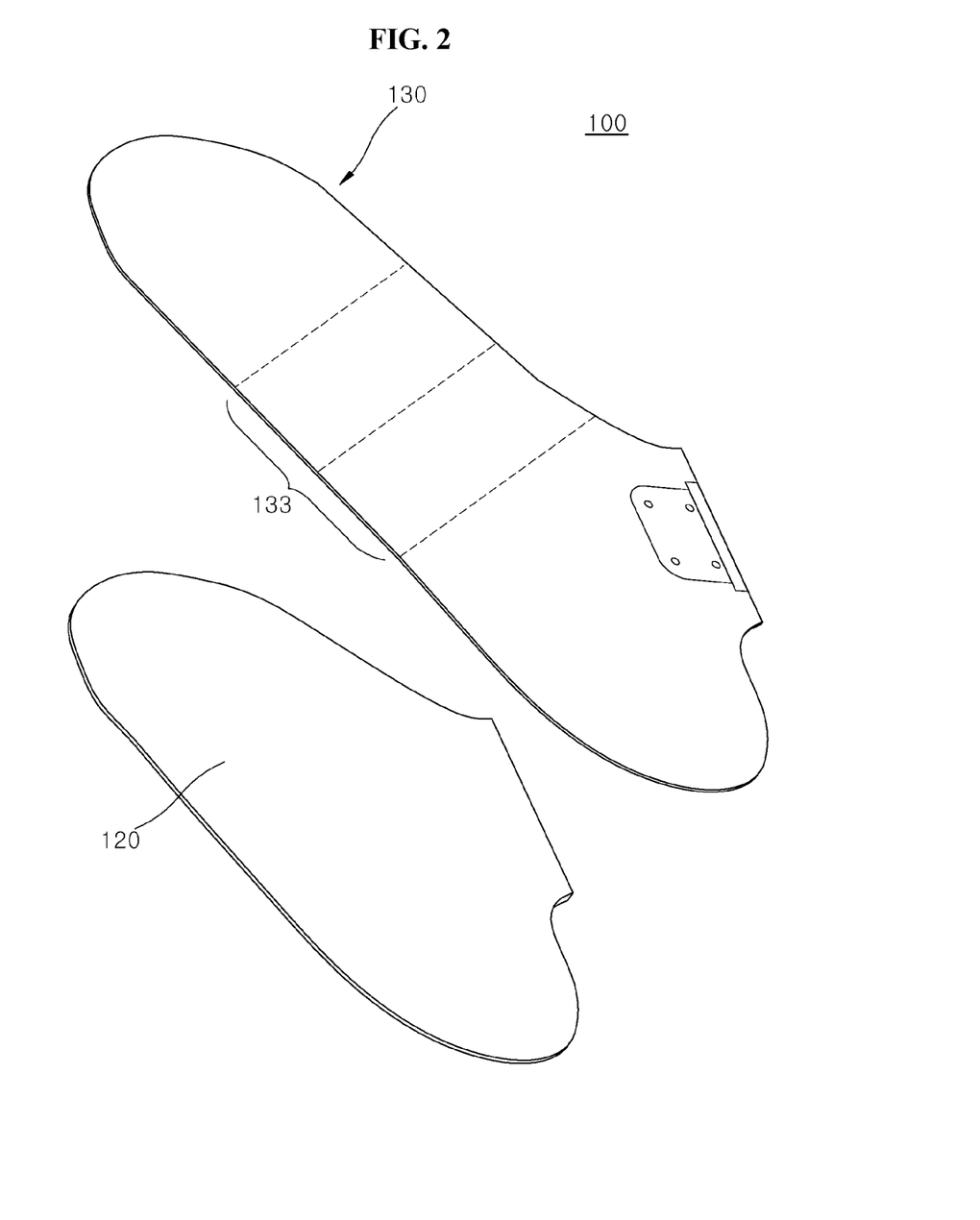
FIG. 2 is a perspective view illustrating that an outboard sheet and inboard sheet are completely deployed in the side airbag apparatus in accordance with the first embodiment of the present invention.
Figure 3:
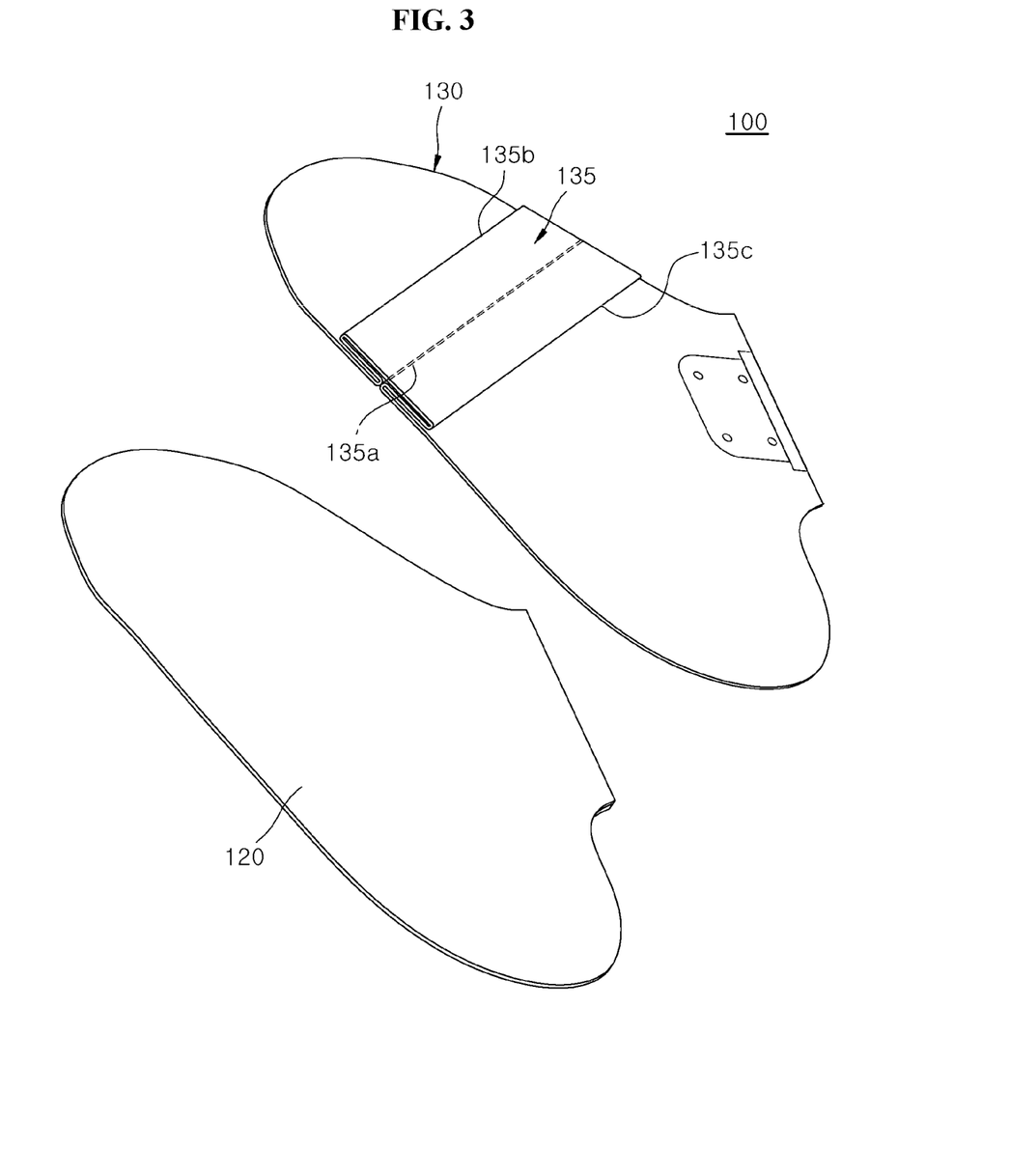
FIG. 3 is a perspective view illustrating that a push chamber is folded in the inboard sheet of the side airbag apparatus in accordance with the first embodiment of the present invention.
Figure 4:
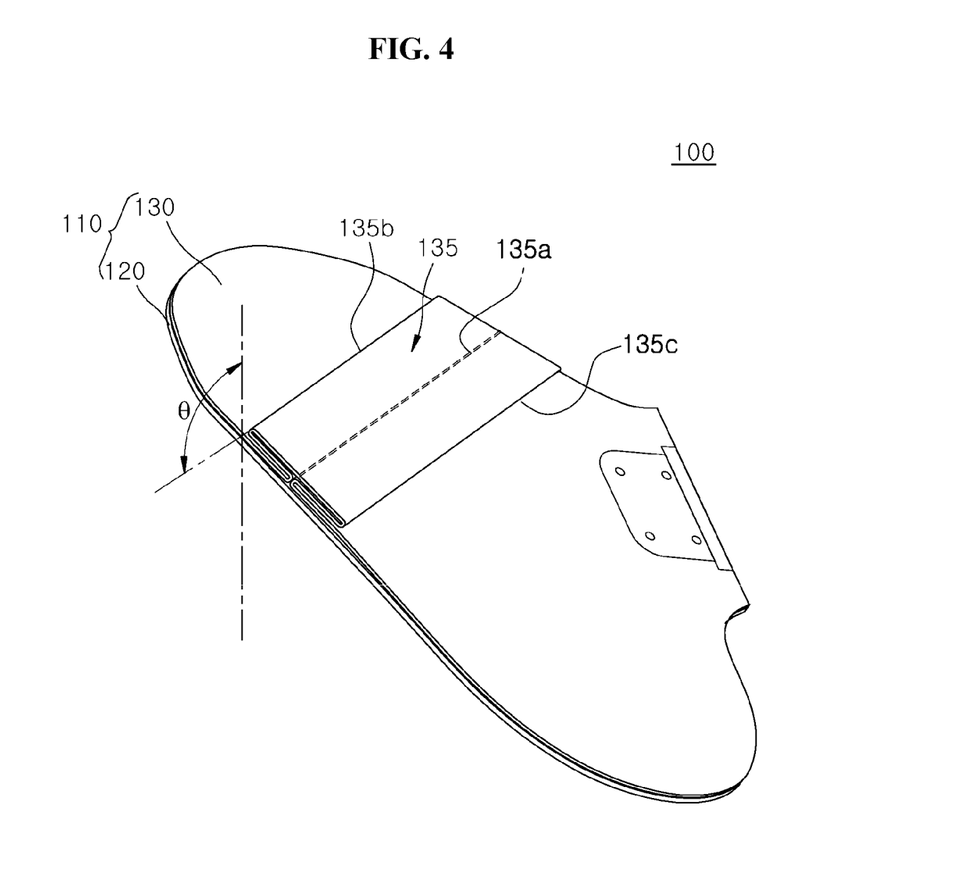
FIG. 4 is a perspective view illustrating that the outboard sheet and the inboard sheet are overlapped with each other in the side airbag apparatus in accordance with the first embodiment of the present invention.
Figure 5:
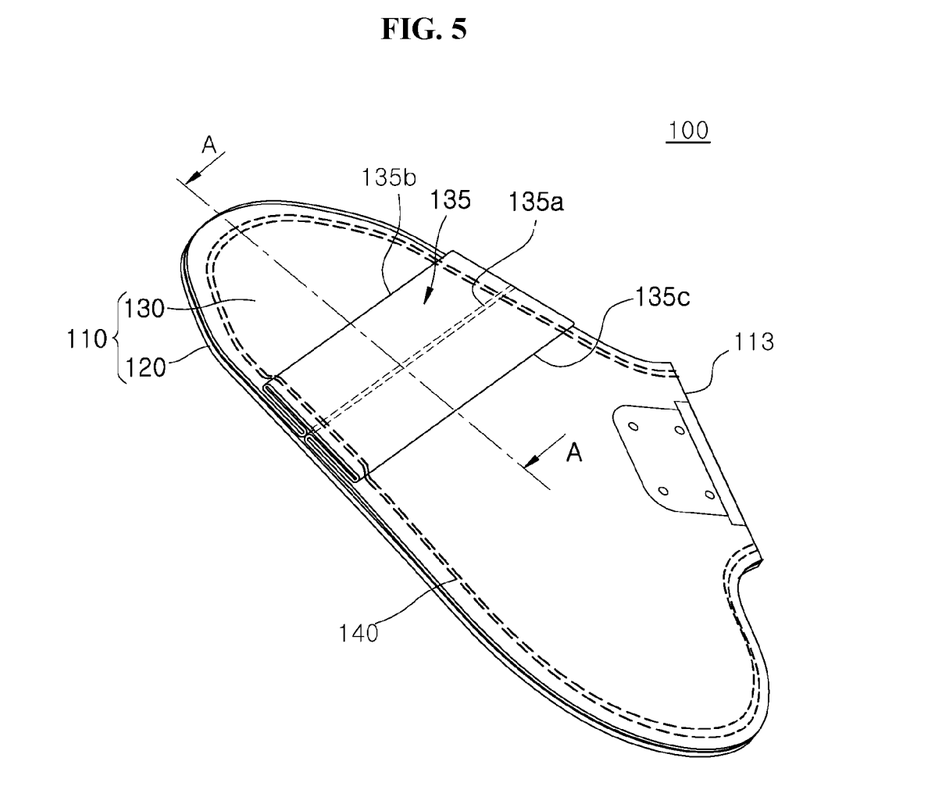
FIG. 5 is a perspective view illustrating that the circumferences of the outboard sheet and the inboard sheet are sewed in the side airbag apparatus in accordance with the first embodiment of the present invention.
Figure 6:
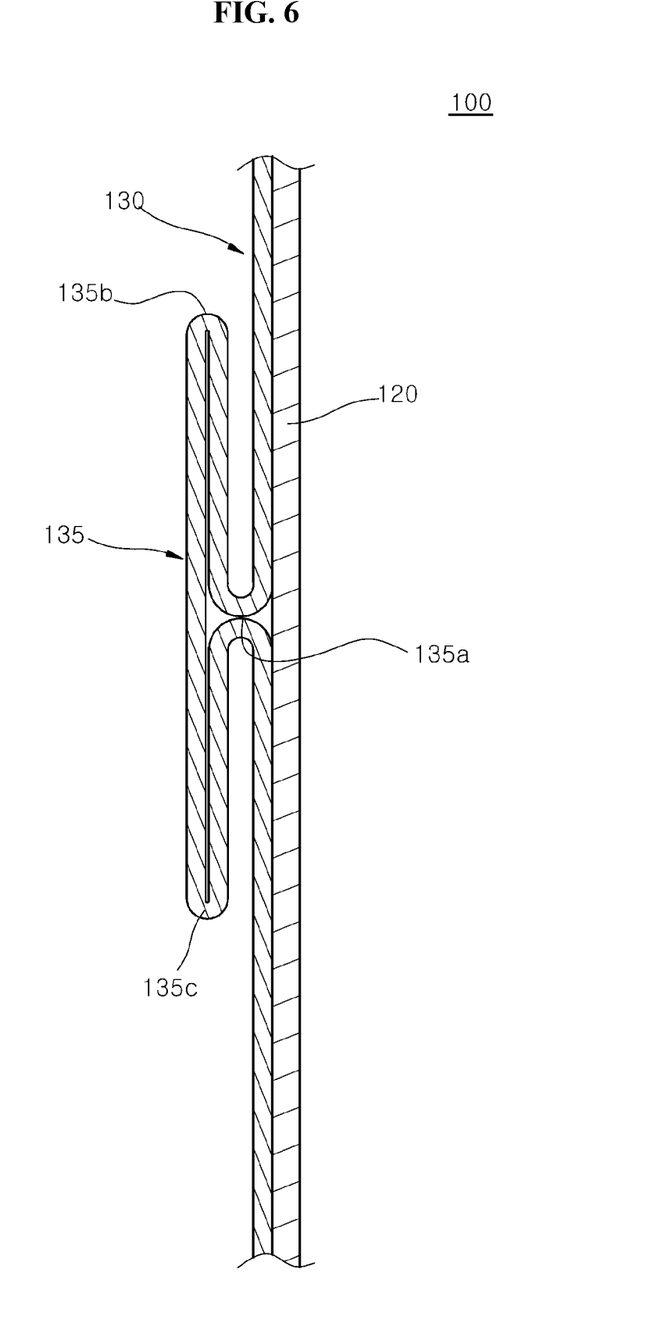
FIG. 6 is a cross-sectional view illustrating that the push chamber is folded on the inboard sheet in the side airbag apparatus in accordance with the first embodiment of the present invention.
Figure 7:
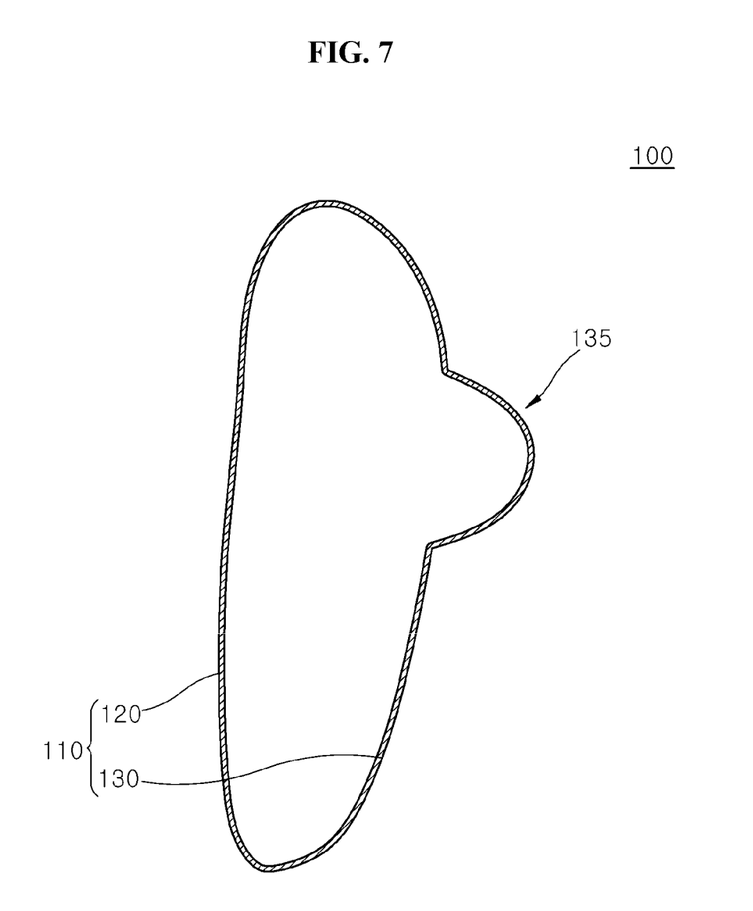
FIG. 7 is a cross-sectional view illustrating that the side airbag apparatus in accordance with the first embodiment of the present invention is completely expanded.

FIG. 1 is a front view schematically illustrating that the side airbag apparatus in accordance with the first embodiment of the present invention is expanded at one side of a seat, FIG. 2 is a perspective view illustrating that an outboard sheet and inboard sheet are completely deployed in the side airbag apparatus in accordance with the first embodiment of the present invention, FIG. 3 is a perspective view illustrating that a push chamber is folded in the inboard sheet of the side airbag apparatus in accordance with the first embodiment of the present invention, FIG. 4 is a perspective view illustrating that the outboard sheet and the inboard sheet are overlapped with each other in the side airbag apparatus in accordance with the first embodiment of the present invention, FIG. 5 is a perspective view illustrating that the circumferences of the outboard sheet and the inboard sheet are sewed in the side airbag apparatus in accordance with the first embodiment of the present invention, FIG. 6 is a cross-sectional view illustrating that the push chamber is folded on the inboard sheet in the side airbag apparatus in accordance with the first embodiment of the present invention, and FIG. 7 is a cross-sectional view illustrating that the side airbag apparatus in accordance with the first embodiment of the present invention is completely expanded.

Referring to FIGS. 1 to 7, the side airbag apparatus 100 in accordance with the first embodiment of the present invention may include an outboard sheet 120, an inboard sheet 130, a push chamber 135 and a sewed part 140.

The side airbag apparatus 100 may be installed at the outside (outboard side) of a seat 10 on which a passenger is seated. The side airbag apparatus 100 may include a buffer chamber 110 which is expanded to cover the body 21 of the passenger seated on the seat 10.

The outboard sheet 120 may be disposed at a door (not illustrated). The outboard sheet 120 may be formed in an elliptical shape as a whole. The outboard sheet 120 may be formed of synthetic fiber.

The inboard sheet 130 may be stacked on an inner surface of the outboard sheet 120, and may form the buffer chamber 110 with the outboard sheet 120. The buffer chamber 110 may have a gas injection part 113 formed at the rear thereof. The inboard sheet 130 and the outboard sheet 120 may form the elliptical buffer chamber 110, as gas is injected. The outboard sheet 120 may be formed of synthetic fiber.

The push chamber 135 may be formed by folding a part of the inboard sheet 130. As gas is injected, the push chamber 135 may be expanded to protrude to the interior of the vehicle, while pushing up an arm 23 of the passenger. One side 135b of the folded part of the push chamber 135 may be disposed at the front based on a central portion 135a, and the other side 135c of the folded part of the push chamber 135 may be disposed at the rear based on the central portion 135a.

Since the push chamber 135 is expanded to push up the arm 23 of the passenger, a space corresponding to the thickness of the arm 23 may be provided at one side of the passenger. Therefore, since a space in which the buffer chamber 110 can be expanded in the thickness direction is sufficiently secured outside the body 21 of the passenger, it is possible to relatively reduce the expansion pressure of the buffer chamber 110, applied to the body (chest) 21 of the passenger. Furthermore, the chest of the passenger can be prevented from being injured by the expansion pressure of the buffer chamber 110.

Since the space corresponding to the thickness of the arm 23 is provided at one side of the passenger, the buffer chamber 110 may be formed to a larger thickness.

Since the arm 23 is pushed up forward by the push chamber 135, the space in which the buffer chamber 110 is to be deployed may be sufficiently secured at one side of the passenger. Therefore, the buffer chamber 110 may not nearly interfere with the arm 23, but be deployed while being stably placed at one side of the passenger.

The arm 23 may be divided in the upper arm and the lower arm based on the elbow. In the following descriptions, the arm 23 may indicate the upper arm.

The circumferences of the outboard sheet 120 and the inboard sheet 130 may be sewed through the sewed part 140, with the push chamber 135 folded. At this time, both sides of the folded push chamber 135 may be sewed through the sewed part 140. Therefore, since the side airbag apparatus 100 is manufactured by sewing the push chamber 135, the outboard sheet 120 and the inboard sheet 130 through one sewing process, the manufacturing time of the side airbag apparatus 100 can be shortened. The sewed part 140 can prevent a position change of the folded push chamber 135.

The inboard sheet 130 may have a larger length than the outboard sheet 120, and the push chamber 135 may be formed by folding a spare region 133 of the inboard sheet 130 after the circumferences of the inboard sheet 130 and the outboard sheet 120 are put together. At this time, the length of the inboard sheet 130 may be decided in consideration of the protrusion length of the push chamber 135. Since the push chamber 135 is formed by folding the inboard sheet 130, a separate push chamber may not be sewed on the inboard sheet 130.

The push chamber 135 may be formed by folding the spare region 133 in two layers from the widthwise central portion toward both sides thereof. Since the push chamber 135 is folded in two layers from the widthwise central portion 135a toward both sides and both sides of the push chamber 135 in the longitudinal direction are sewed through the sewed part 140, the push chamber 135 may be convexly expanded to the interior from the buffer chamber 110 so as to press the rear of the arm 23.

The push chamber 135 may be positioned eccentrically to one side (upper side) based on the longitudinal central portion of the inboard sheet 130. The position of the push chamber 135 may be properly changed depending on the size and installation height of the push chamber 135.

The push chamber 135 may be inclined downward at a predetermined angle θ toward the front, in order to push up the arm 23 of the passenger from the rear. Since the push chamber 135 is inclined downward toward the front, a contact area with the rear of the arm 23 may be increased with the expansion of the push chamber 135. Therefore, while the supporting force of the push chamber 135 is improved, a separation of the arm 23 from the push chamber 135 can be prevented. Furthermore, since the push chamber 135 is inclined to support the arm 23 in the inclined state, the arm 23 may be smoothly turned toward the interior of the vehicle while being pressed by the buffer chamber 110. Therefore, a space in which the buffer chamber 110 is to be expanded and deployed can be sufficiently secured between the sidewall of the vehicle body and the body 21 of the passenger.

The operation of the side airbag apparatus in accordance with the first embodiment of the present invention will be described.

Figure 8:
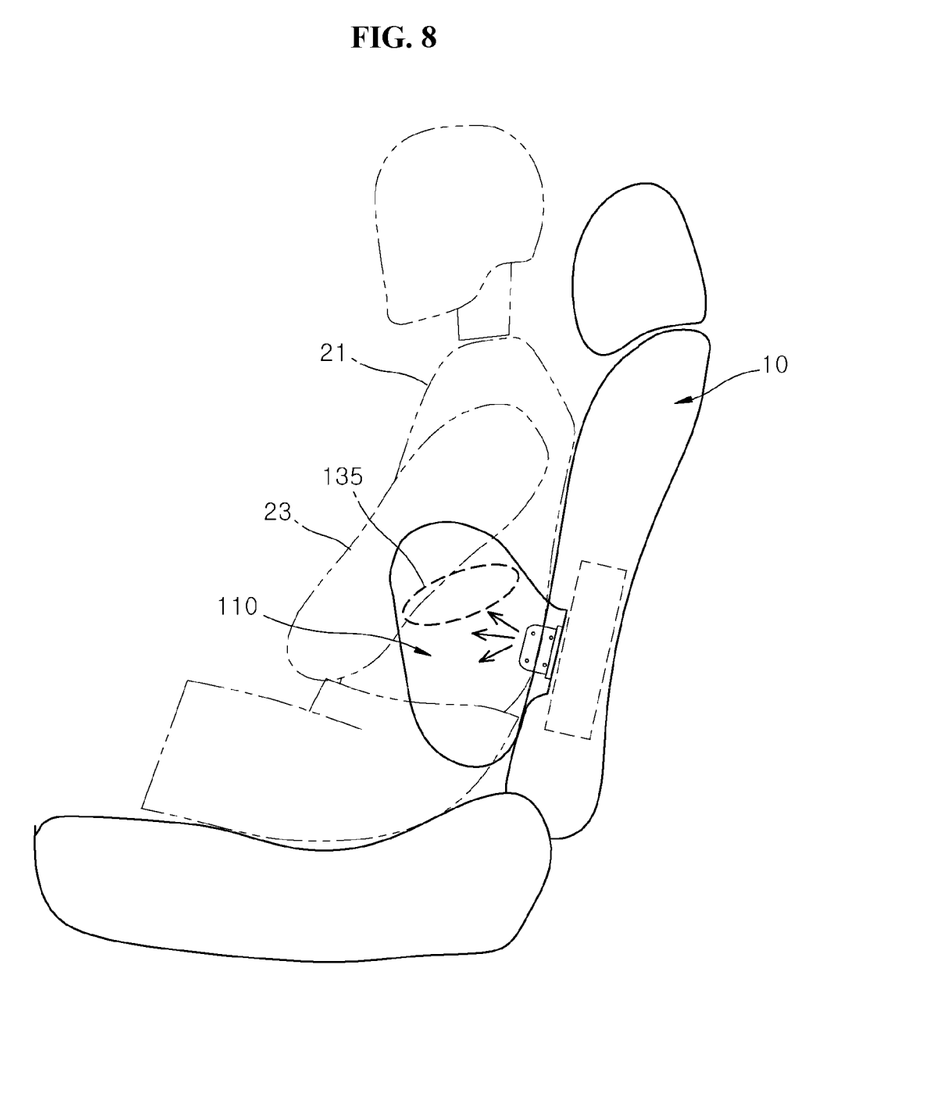
FIG. 8 is a side view illustrating that the buffer chamber and the push chamber are initially expanded in the side airbag apparatus in accordance with the first embodiment of the present invention.
Figure 9:
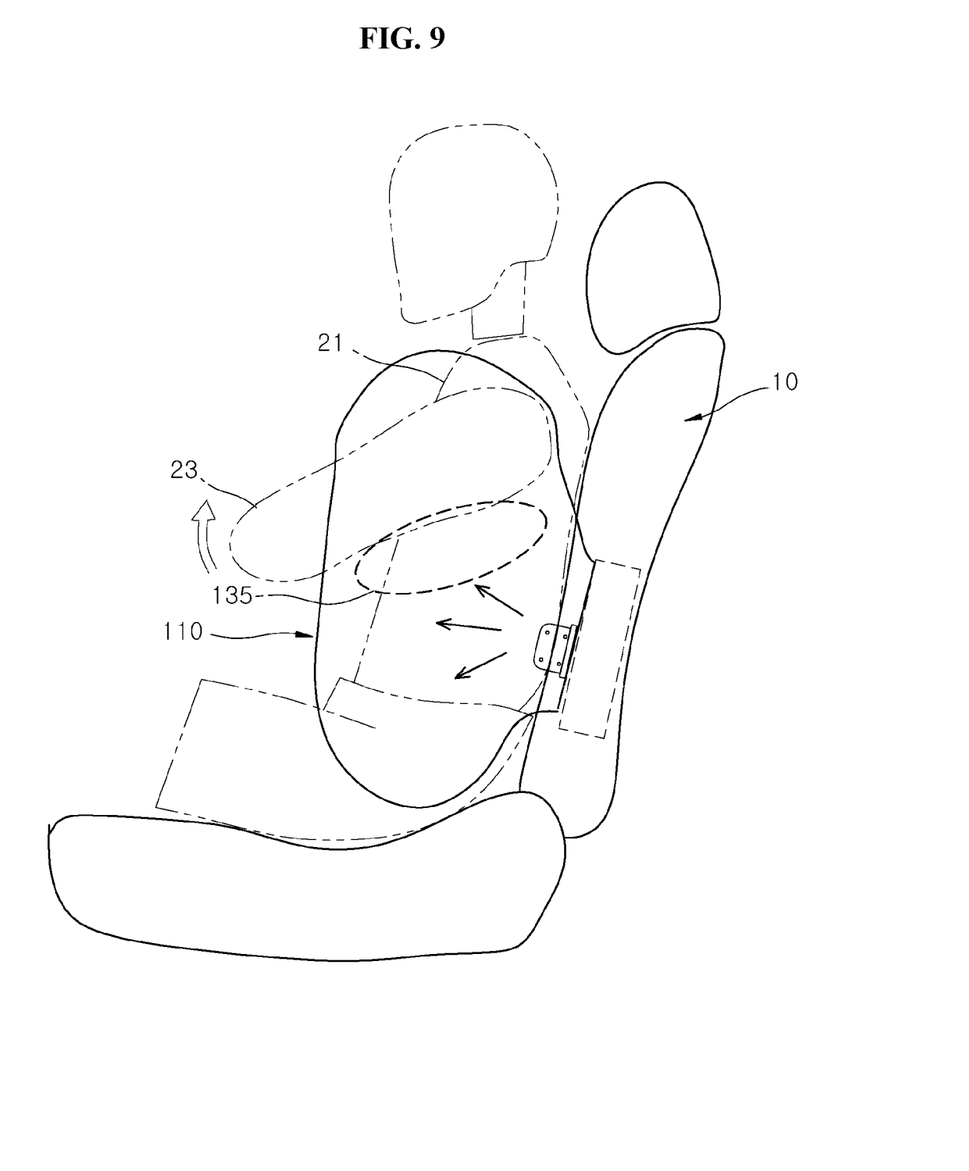
FIG. 9 is a side view illustrating that the buffer chamber and the push chamber are expanded to push up an arm in the side airbag apparatus in accordance with the first embodiment of the present invention.

FIG. 8 is a side view illustrating that the buffer chamber and the push chamber are initially expanded in the side airbag apparatus in accordance with the first embodiment of the present invention, and FIG. 9 is a side view illustrating that the buffer chamber and the push chamber are expanded to push up an arm in the side airbag apparatus in accordance with the first embodiment of the present invention.

Referring to FIGS. 8 and 9, gas generated by the inflator may be introduced into the buffer chamber 110 formed by the outboard sheet 120 and the inboard sheet 130, in case of an oblique collision of the vehicle. As the buffer chamber 110 is expanded, the folded push chamber 135 may be unfolded and expanded.

The buffer chamber 110 may cover the outside (outboard side) of the body 21 of the passenger, while being deployed forward from the side surface of the seat 10. The push chamber 135 may protrude while expanding to the interior (inboard side) from the buffer chamber 110. At this time, the buffer chamber 110 and the push chamber 135 may be deployed in directions substantially perpendicular to each other.

Since the buffer chamber 110 is expanded and deployed forward and the push chamber 135 is deployed to protrude to the interior, the push chamber 135 may push up the arm 23 from the rear. Since the arm 23 is turned upward by the expansion pressure of the push chamber 135, a space in which the buffer chamber 110 is be expanded may be sufficiently secured at the side of the vehicle body and the body 21.

When the buffer chamber 110 is completely expanded, the buffer chamber 110 may press the body 21 and the arm 23 toward the interior of the vehicle. At this time, since the push chamber 135 pushes up the arm 23 and supports the arm 23, the arm 23 may be turned toward the interior when the expansion pressure of the buffer chamber 110 is applied to the arm 23. At this time, since a space corresponding to the thickness of the arm 23 is provided at one side of the body 21, the expansion pressure of the buffer chamber 110, applied to the body 21, may be relatively reduced. Therefore, the chest of the passenger can be prevented from being injured by the expansion pressure of the buffer chamber 110.

Next, a side airbag apparatus in accordance with a second embodiment of the present invention will be described. Since the second embodiment has substantially the same structure as the first embodiment except the folding structure of the push chamber, the folding structure of the second embodiment will be described. In the second embodiment, the same components as those of the first embodiment may be represented by like reference numerals.

Figure 10:
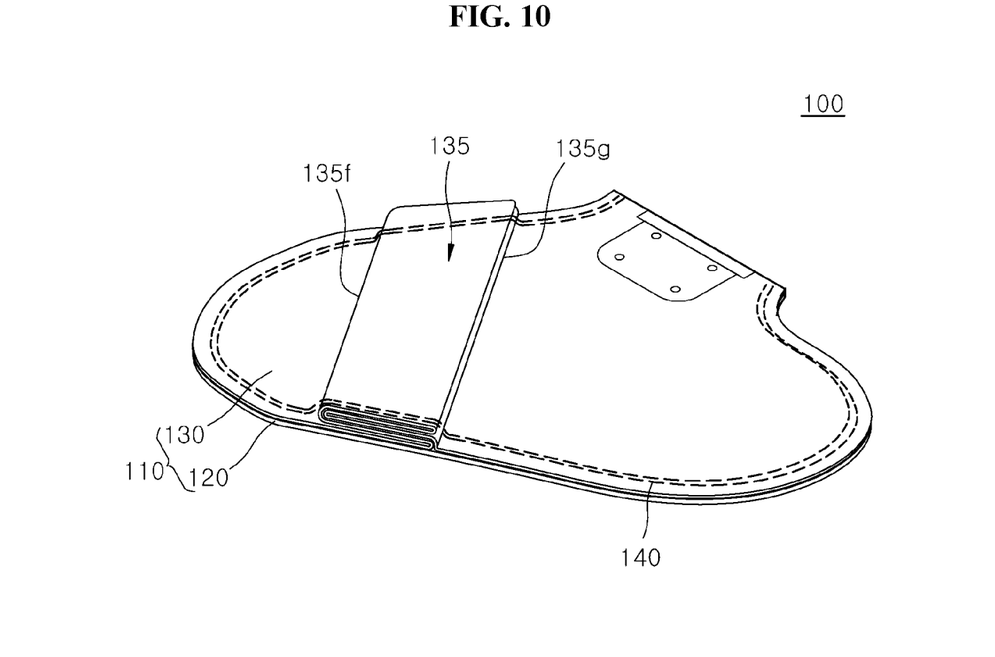
FIG. 10 is a perspective view illustrating that a push chamber is folded in a side airbag apparatus in accordance with a second embodiment of the present invention.
Figure 11:
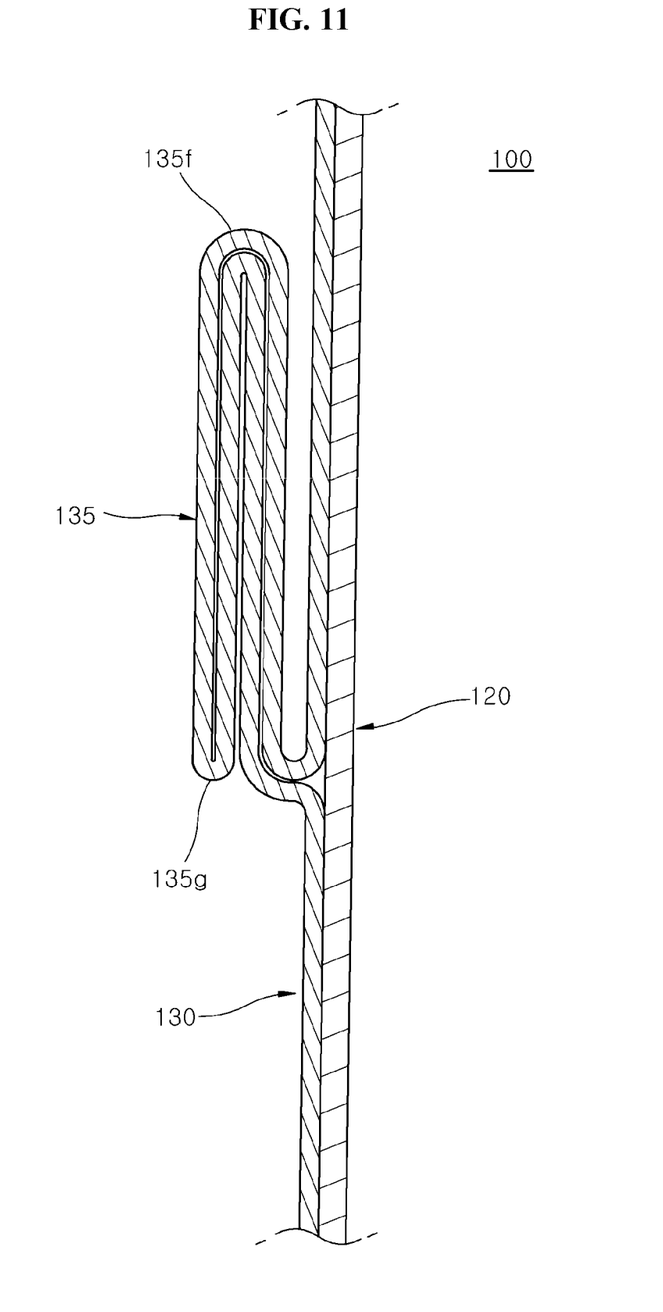
FIG. 11 is a cross-sectional view illustrating that the push chamber is folded in the side airbag apparatus in accordance with the second embodiment of the present invention.

FIG. 10 is a perspective view illustrating that the push chamber is folded in the side airbag apparatus in accordance with the second embodiment of the present invention, and FIG. 11 is a cross-sectional view illustrating that the push chamber is folded in the side airbag apparatus in accordance with the second embodiment of the present invention.

Referring to FIGS. 10 and 11, the push chamber 135 of the side airbag apparatus may be formed by folding a part of the inboard sheet 130. As gas is injected, the push chamber 135 may be expanded to protrude to the interior of the vehicle, while pushing up an arm 23 of a passenger.

The inboard sheet 130 may have a larger length than the outboard sheet 120, and the push chamber 135 may be formed by folding a spare region 133 of the inboard sheet 130 after the circumferences of the inboard sheet 130 and the outboard sheet 120 are put together. Since the push chamber 135 is formed by folding the inboard sheet 130, a separate push chamber may not be sewed on the inboard sheet 130.

The push chamber 135 may be formed by folding the spare region 133 (refer to FIG. 2) in a zigzag manner along the widthwise direction of the push chamber 135. After the spare region 133 is folded, the push chamber 135 may be folded once toward one side, and then folded once toward the other side. The folded portion of the push chamber 135 at one side thereof may correspond to the widthwise central portion 135f of the push chamber 135, and the end 135g of the push chamber 135 may be positioned at the other side thereof. The push chamber 135 may be folded two or more times.

Since the push chamber 135 is folded in a zigzag manner in the widthwise direction of the push chamber 135 and both sides of the push chamber 134 in the longitudinal direction thereof are sewed through the sewed part 140, the push chamber 135 may be convexly expanded to the interior from the buffer chamber 110 so as to press the rear of the arm 23.

Since the push chamber 135 is expanded to push up the arm 23 of the passenger, a space corresponding to the thickness of the arm 23 may be provided at one side of the passenger. Therefore, since a space in which the buffer chamber 110 can be expanded in the thickness direction is sufficiently secured outside the body 21 of the passenger, it is possible to reduce the expansion pressure of the buffer chamber 110, applied to the chest of the passenger. Furthermore, the chest of the passenger can be prevented from being injured by the expansion pressure of the buffer chamber 110.

Although exemplary embodiments of the present disclosure have been shown and described hereinabove, the present disclosure is not limited to specific exemplary embodiments described above, but may be variously modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A side airbag apparatus comprising:
an outboard sheet disposed at a side of a vehicle;
an inboard sheet stacked on an inner surface of the outboard sheet, and forming a buffer chamber with the outboard sheet;
a push chamber formed by folding a part of the inboard sheet, expanded to protrude outwardly from the buffer chamber toward the interior of the vehicle with injection of gas, and pushing up an arm of a passenger; and
a sewed part through which circumferences of the outboard sheet and the inboard sheet are sewed, with the push chamber folded,
wherein the buffer chamber and the push chamber, when expanded, are continuous with each other with no partitions therebetween.

2. The side airbag apparatus of claim 1, wherein:
a length of the inboard sheet is greater than that of the outboard sheet; and
the push chamber is formed by folding a spare region of the inboard sheet after the circumferences of the inboard sheet and the outboard sheet are put together.

3. The side airbag apparatus of claim 2, wherein the push chamber is formed by folding the spare region in two layers from the widthwise central portion of the spare region to both sides in the widthwise direction.

4. The side airbag apparatus of claim 3, wherein the push chamber is formed by folding the spare region in a zigzag manner in the widthwise direction of the push chamber.

5. The side airbag apparatus of claim 4, wherein the push chamber is positioned eccentrically at one side based on the longitudinal central portion of the inboard sheet.

6. The side airbag apparatus of claim 4, wherein the push chamber is inclined downward toward a front part of the arm of the passenger so as to push up a rear part of the arm of the passenger.

7. The side airbag apparatus of claim 1, wherein both sides of the folded push chamber are sewed through the sewed part.

* * * * *